(12) United States Patent
Pothireddy et al.

(10) Patent No.: US 8,161,366 B2
(45) Date of Patent: Apr. 17, 2012

(54) FINITE STATE MACHINE ERROR RECOVERY

(75) Inventors: Anil Pothireddy, Hyderabad (IN); Neranjen Ramalingam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1168 days.

(21) Appl. No.: 11/949,305

(22) Filed: Dec. 3, 2007

(65) Prior Publication Data
US 2009/0144588 A1    Jun. 4, 2009

(51) Int. Cl.
*G06F 11/00* (2006.01)
(52) U.S. Cl. ............................................. 714/814
(58) Field of Classification Search .................. 714/752, 714/814
See application file for complete search history.

(56) References Cited

U.S. PATENT DOCUMENTS

| | | | |
|---|---|---|---|
| 4,882,577 A | 11/1989 | DeVore | |
| 5,355,113 A | 10/1994 | McClure | |
| 5,357,236 A | 10/1994 | McClure | |
| 5,511,078 A * | 4/1996 | Barucchi et al. | 714/763 |
| 7,149,938 B1 * | 12/2006 | Acikel et al. | 714/709 |
| 7,810,019 B2 * | 10/2010 | Liao | 714/795 |
| 2007/0016823 A1 | 1/2007 | Jang et al. | |
| 2010/0174966 A1 * | 7/2010 | Kim et al. | 714/752 |

OTHER PUBLICATIONS

Enhanced Reliability of Finite-State Machines in FPGA Through Efficient Fault Detection and Correction, Anurag Tiwari, Student Member, IEEE, and Karen A. Tomko, Member, IEEE, IEEE Transactions on Reliability, vol. 54, No. 3, Sep. 2005.

Hardware Fault Tolerance: An Immunological Solution, D. W. Bradley and A. M. Tyrrell, Department of Electronics, University of York, 2000 IEEE.

Design Methodology of FSMs with Intrinsic Fault Tolerance and Recovery Capabilities, R. Leveugle and L. Martinez, 1992 IEEE.

\* cited by examiner

*Primary Examiner* — James C Kerveros
(74) *Attorney, Agent, or Firm* — Roy W. Truelson

(57) ABSTRACT

A method and system for using a magnitude comparator circuit and a flag bit, for detecting and preventing errors from occurring in the FSM state bits that could otherwise cause the system to hang. Preferably, the flag bit is set with all the valid state transitions, and a magnitude comparator is used to continuously monitor the value of the current state bits. When a FSM state transition occurs based on the flag bit and the output of the magnitude comparator, a potential error condition can be detected and the FSM transition can be blocked or the FSM can be safely transitioned into a predetermined "reset state".

22 Claims, 2 Drawing Sheets

FINITE STATE MACHINE ERROR RECOVERY

FIELD OF THE INVENTION

The present invention relates generally to finite state machines and to methods and arrangements for managing error recovery in same.

BACKGROUND OF THE INVENTION

Finite State Machines (FSM), as known, have long been an integral part of digital logic designs (which involve circuits operating on binary values, i.e. '0' and '1', or also called OFF and ON states, or logic '0' and logic '1' states) and are found in a majority of ASIC (Application-Specific Integrated Circuit) and FPGA (Field-Programmable Gate Array) designs. Modern digital electronic designs, however, have become susceptible to errors for a variety of reasons; generally, a digital system is said to be "in error" if one or more logic values in it are inadvertently flipped (e.g., a "0" becomes a "1" or vice versa). Such reasons include, but by no means are limited to, alpha particle radiations (e.g., space applications), Electronic-Magnetic Interference (EMI) (especially with electronic appliances in the vicinity), and harsh environmental conditions (e.g., as found in military applications). With increasing clock frequencies and shrinking transistor sizes, there are more leakage currents and greater cross talk in today's ASICs and FPGAs.

Most digital designs have a data path and a control path, and there is virtually an equivalent likelihood of an error occurring in either control path or data path and thereby causing the system to malfunction. When logic value changes (errors) occur in the data path, the data gets corrupted, and when such errors occur in the control path, the system may generally exhibit faulty behavior. Some errors are recoverable while others are not; recoverable errors include those from which the malfunctioning system can be eventually recovered with at worst a temporary loss of data and system run time. On the other hand, non-recoverable errors put the system in a dead-lock state or cause the system to hang (enter a dead-lock condition), and a manual reset of the system may be required.

In case of FSMs, when the value of one or more inputs to the flip-flops that hold the current state value are inadvertently flipped by error-causing conditions, the system may enter a dead-lock condition (hang) in some cases. When the system enters a dead-lock state the only way out would be a reset of the system.

There are many critical applications where resetting the system may not always be possible. For example, embedded systems used in automobiles in motion, or that assist in surgical processes, in space exploration missions, or in applications where live data is being processed, would all not lend themselves to a reset, and many more examples of course exist. In some applications though, a system reset is indeed possible, while this still leads to some degree of inconvenience. Examples of such applications include, but of course are not limited to, e.g., embedded applications used in home appliances such as refrigerators and DVD players, etc., and server applications processing huge amounts of data.

Currently, a widely used technique that addresses FSM state errors to some degree is "one-hot" encoding. A general discussion of one-hot encoding may be found in Alfke, Peter, "Accelerate FPGA Macros with One-hot Approach", Electronic Design, Sep. 13, 1990. The disadvantages of this technique, however, are many and include the following:

The number of bits needed is linearly proportionate to the number of states, so more area is needed (i.e., more flip flops are needed than in other encoding methods) and the decoding of states takes considerable time.

The probability of error occurrence is greater (proportional to the bit length).

The technique will not work if two bits (including the active state bit) are flipped by an error.

The technique is limited to error detection only, and not at all to error prevention.

Accordingly, compelling needs have been recognized in connection with improving upon the shortcomings and disadvantages of conventional methods and arrangements for addressing FSM state errors.

SUMMARY OF THE INVENTION

In accordance with at least one presently preferred embodiment of the present invention, there is broadly contemplated herein the use of a simple added circuit, and of a flag bit, for detecting and preventing errors from occurring in the FSM state bits that could otherwise cause the system to hang.

Preferably, the flag bit is set with all the valid state transitions, and a magnitude comparator (or analogous component) is used to continuously monitor the value of the current state bits. When a FSM state transition occurs, based on the flag bit and the output of the magnitude comparator, a potential error condition can be detected and the FSM transition can be blocked or the FSM can be safely transitioned into a predetermined "reset state".

In summary, one aspect of the invention provides a method of encoding a finite state machine, the method comprising the steps of: providing a finite state machine, the finite state machine including a plurality of states; binary-encoding the states; and averting invalid state transitions among the states via ascertaining prospective bit errors.

According to a further aspect of the invention a system for encoding a finite state machine provided, the system comprising: an arrangement for binary-encoding states in the finite state machine; and an arrangement for averting invalid state transitions among the states via ascertaining prospective bit errors.

Furthermore, an additional aspect of the invention provides a program storage device readable by machine, tangibly embodying a program of instructions executable by the machine to perform a method comprising the steps of: providing a finite state machine, the finite state machine including a plurality of states; binary-encoding the states; and averting invalid state transitions among the states via ascertaining prospective bit errors.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
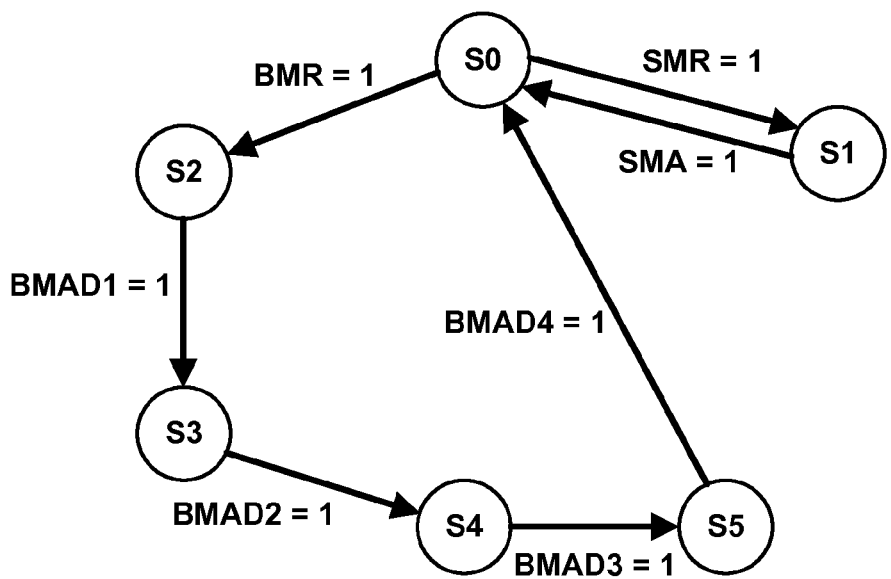
FIG. 1 schematically depicts a small FSM.
Figure 2:
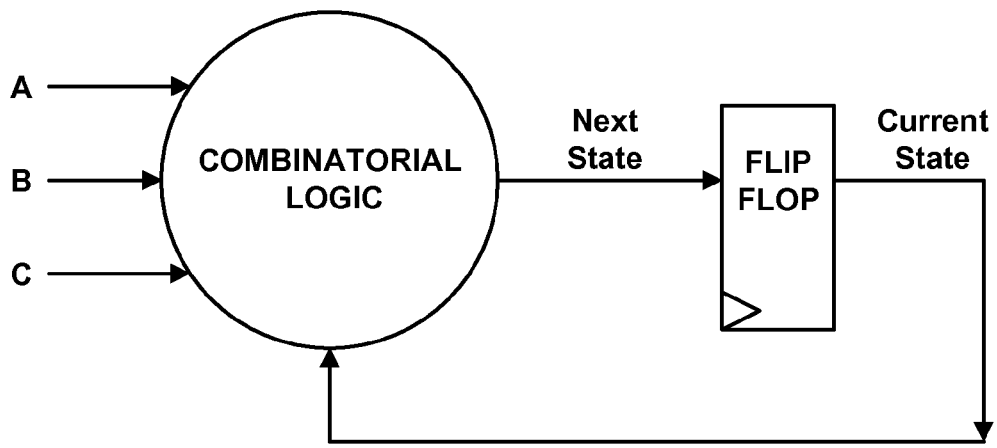
FIG. 2 schematically depicts a conventional mechanism for generating a Next State and Current State.
Figure 3:
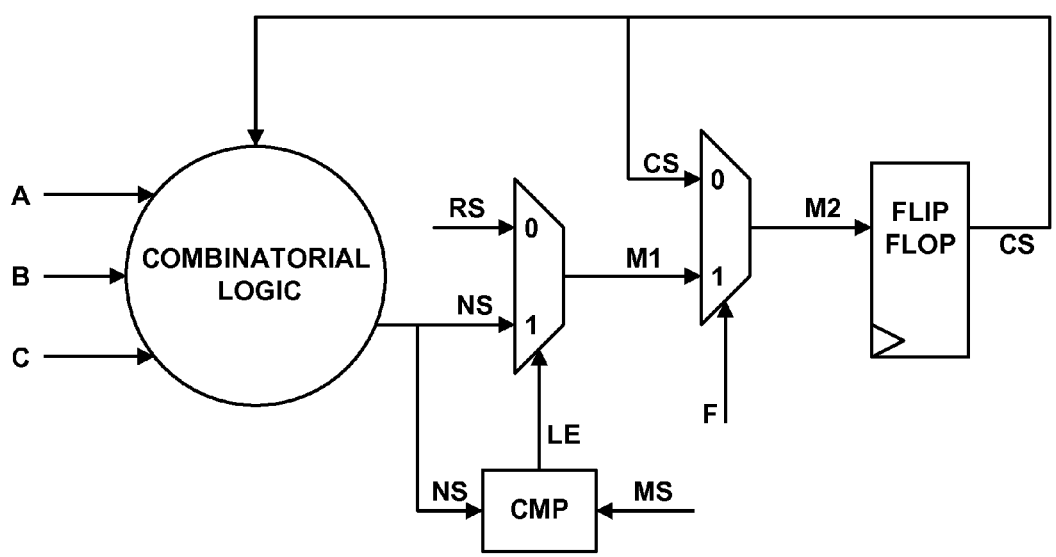
FIG. 3 schematically depicts a novel mechanism for generating a Next State.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 3, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Generally, finite state machines can use binary encoding or one-hot encoding for holding a current state value in a set of flip flops. However, in harsh conditions, the probability of the occurrence of an error increases proportionately with the number of bits in use. To encode a FSM with six valid states, binary encoding needs 3 bits and one-hot encoding needs 6 bits. There are 2 unused state combinations in binary encoding of the above example and 58 invalid states when one-hot encoding is used in the above example. Clearly, the advantage of simpler error detection that one-hot encoding offers is overridden by increased probability of error occurrence. Also, for huge designs where the FSM states can be as big as 16, one-hot encoding will not work as efficiently as binary encoding, due to the significantly large time it takes to decode a state, as well as to detect an error.

Accordingly, broadly contemplated herein, in accordance with at least one presently preferred embodiment of the present invention, is an algorithm where binary encoding can be used along with a simple additional circuit to predict bit errors occurring due to one or more inputs of the flip-flops used to hold the current state encode flipping their values.

FIG. 1 schematically depicts a small FSM showing all valid states and possible state transitions, where: a circle denotes a valid FSM state; an arrow denotes a possible FSM state transition based on the stated condition; S0 through S5 convey state names representing a binary encode of 000 through 101 SMR is a Single Mode Request; SMA is a Single Mode Ack; BMR is a Burst Mode Request; BMAD1 is a Burst Mode Ack (acknowledge signal) for a Data-word 1; BMAD2 is a Burst Mode Ack for a Data-word 2; BMAD3 is a Burst Mode Ack for a Data-word 3; and BMAD4 is a Burst Mode Ack for a Data-word 4.

Accordingly, to help provide a better understanding of the above-discussed inventive technique, and with reference to FIG. 1, consider an example of a smaller FSM with six valid states, designated S0, S1, S2, S3, S4, and S5. (The technique described here can be extended to FSM with any number of states). The enumerated binary encoding for the above states will be 000, 001, 010, 011, 100, and 101 respectively. There are two unused encodes 110 and 111 (or S6 and S7).

Accordingly, there are two conditions that can cause the FSM to enter a dead lock state, which are as follows:

(1) An inadvertent transition to another state.
(2) A transition to an invalid state.

Condition (1) is relatively safe, but nevertheless could put the FSM in a dead-lock state in some conditions. Condition (2), however, is more detrimental as there is no way to put the FSM back to a valid state, since state transitions are not defined from invalid states.

FIG. 1 illustrates all the valid state transitions for the FSM. The two above-listed error scenarios (1 and 2) can be depicted as follows. In accordance with error scenario (1), the FSM transitions from S0 (000) to S1 (001) when SMR=1, and it waits in S1 till SMA=1. Consider a case where the input feeding to the mid flip-flop gets flipped to a '1' inadvertently, then state S1 becomes S3 (011). As is apparent from FIG. 1, the only way out of state S3 is when BMAD2=1, but the FSM also requires that this condition should be preceded by BMR=1 and BMAD1=1. It is not possible to get an ACK (BMAD2) for a REQUEST (BMR) that never happened. Thus the FSM will be in a dead-lock state and can't recover from it.

In accordance with error scenario (2), while the FSM is transitioning from S4 (100) to S5 (101), consider a case where the input feeding to the mid flip-flop gets flipped to a '1' inadvertently, the FSM then transitions to S7 (111) an invalid state. There is no way to bring back the FSM back to a valid state as the state transitions are not defined for invalid states. Thus the FSM will be in a dead-lock state and can't recover from it.

Accordingly, there is broadly contemplated herein, in accordance with at least one presently preferred embodiment of the present invention, a solution that detects the above two dead-lock causing conditions and blocks the erroneous transitions from happening in the FSM.

By way of comparison, FIG. 2 schematically depicts a conventional mechanism for generating a Next State and Current State, and this mechanism has been used by many conventional FSM's. As depicted, based on the Current State value and optionally on one or more inputs (A, B, C), the Next State is determined and is fed to the input of the Current State flip-flops. At the clock's active edge transition (the beginning of every clock cycle), the Next State value becomes the Current State value (output of the flip-flop), and based on the new Current State and inputs the Next State for the current cycle is computed. It should be noted that when a state transition is not required, the Next State value will simply be the same as the Current State value. Of concern, however, is that due to one or more error causing conditions (such as those outlined further above), the Next State value could be in error and may put the FSM in an undesired or non-existing state from which the FSM may not be put back to a known state.

By contrast, in accordance with a preferred embodiment of the present invention, FIG. 3 schematically depicts a novel mechanism for generating a Next State where:

NS=Next State of the FSM derived from Current State and (optionally) from some inputs;
RS=Reset State, which is implementation-dependant;
CS=Current State of the FSM, or the output value of the flip-flops;
MS=Magnitude of the binary encode of the last valid state (i.e., the largest binary value among valid states);
M1=Output of Mux-1 based select signal LE;
M2=Output of Mux-2 based select signal F;

CMP=Magnitude comparator circuit that asserts LE when NS is less than or equal to MS;

LE=Output of the magnitude comparator, when '1' indicates NS is less than or equal to MS;

F=Flag Bit generated for every active state transition in the FSM; and

A, B, C=Inputs that may be used by the FSM for state transition.

Preferably, a flag bit (F) is asserted (driven to a value "1") whenever an active state transition is intended. More particularly, active state transitions are those that require the FSM to transition to another known valid state based on the current state value and optionally one or more input values. For example, in the context of the FSM shown in FIG. 1, assuming the FSM is in S0 state, the flag bit will be set only when SMR=1 and the intended next state value is S1. As long as SMR=0, the FSM remains in state S0 and the flag bit is not set. Thus the flag bit will help in masking any unintentional state transitions.

Preferably, a magnitude comparator is used to compare the Next State (NS) value with the state encode of the last state in use. (The assumption here is that all the states are assigned values sequentially when they are enumerated, which is normally the case.) NS should always be less than or equal to the encoded magnitude of the last state (MS). A signal LE is generated to indicate a positive result when the NS and MS values are compared (i.e. NS is less than or equal to MS). For example, referring again to the small FSM of FIG. 1, MS will be the binary value of the last state S5 which is 101.

With the help of the flag bit (F) and the output of the magnitude comparator (LE), invalid state transitions can be blocked from happening or the FSM will be put in a pre-determined Reset State. Preferably, instead of directly feeding the NS value to the inputs of the flip-flops in every cycle, a two-stage MUX can be used for gating the invalid transitions.

In the first stage, based on the output of the magnitude comparator, a MUX is preferably used to select either the computed Next State (NS) or a pre-determined Reset State (RS). The assumption is that the value of the Next State (NS) should always be less than or equal to the encoded magnitude of the last state (MS), i.e. LE=1. Thus, when the MUX select LE=1, the Next State (NS) is passed to the next stage else when LE=0 (error condition), the Reset State (RS) is passed to the next stage. The output of the MUX (M1) will be RS (when LE=0) or NS (when LE=1). Hence, this level of multiplexing provides protection against FSM state transitions to invalid states.

In a second stage, based on the Flag bit (F), a MUX is preferably used to select either the output of the previous stage MUX (M1) or loop back the Current State value (CS). The assumption is that the Flag bit will be set for all valid FSM state transitions, i.e. F=1. So when the MUX select F=1, M1 (NS or RS) is passed to the input of the flip-flops, and when F=0 the Current State value (CS) is fed back to the input of the flip-flops (which blocks any inadvertent transitions to another state).

Thus, using the two-stage multiplexing just described, the primary error-causing conditions in FSM that can put the FSM in a dead-lock state are actually averted.

It should be understood that the use of a magnitude comparator, as broadly contemplated herein, is provided as an illustrative and non-restrictive example, and that other analogous components may be similarly employed. Essentially, a magnitude comparator can be replaced by any piece of hardware or software configured to ascertain that an encoded value of a Next state is not present among the valid states. This can of course be undertaken in a great variety of ways, as will be appreciated by those of ordinary skill in the art.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of maintaining state data in a finite state machine, said method comprising the steps of:
recording a current state of a finite state machine in a set of N binary memory elements of said finite state machine, wherein N>1, the finite state machine including a plurality of defined valid states, each defined valid state corresponding to a respective binary encoding of N bits, each bit corresponding to a respective binary memory element of the set of N binary memory elements, there being a respective set of defined valid state transitions corresponding to each defined valid state, wherein for at least one defined valid state, the respective set of defined valid state transitions does not include at least one transition to a defined valid state;
repeatedly updating said current state by transitioning from a respective current state to a respective next state recorded in said set of N binary memory elements; and
averting one or more respective invalid state transitions from each current state of a plurality of current states to a respective next state via ascertaining one or more respective prospective bit errors, each said invalid state transition being a state transition which is not a member of any of the sets of defined valid state transitions.

2. The method according to claim 1, wherein said averting comprises employing a magnitude comparator which compares a binary encoding of a next state with a binary encoding of a first valid state to ascertain prospective bit errors.

3. The method according to claim 1, wherein said averting comprises ascertaining prospective bit errors associated with an incorrectly flipped value in a flip-flop input.

4. The method according to claim 1, wherein said averting comprises ascertaining a prospective inadvertent state transition.

5. The method according to claim 1, wherein said averting comprises ascertaining a prospective transition to a binary encoded value representing an invalid state.

6. The method according to claim 1, wherein said averting comprises: ascertaining a prospective inadvertent state transition; and
ascertaining a prospective transition to a binary encoded value representing an invalid state.

7. The method according to claim 1, wherein said averting comprises generating a flag bit corresponding to a prospective active state transition of a state.

8. The method according to claim 7, wherein said averting further comprises, for a state with a generated flag bit, comparing a binary encoding of a next state value with an encoded magnitude of a largest binary value among valid states.

9. The method according to claim 8, further comprising the step of permitting an active state transition responsive to the binary encoding of the next state value being less than or equal to the encoded magnitude of a largest binary value among valid states.

10. The method according to claim 8, wherein said averting further comprises preventing an active state transition responsive to the binary encoding of the next state value being greater than the encoded magnitude of a largest binary value among valid states.

11. The method according to claim 7, wherein said averting further comprises gating prospective invalid state transitions via a two-stage MUX.

12. The method according to claim 11, wherein, in a first stage, the MUX selects either of a next state or a reset state.

13. The method according to claim 12, wherein, in a second stage, the MUX selects either of an output of said first stage or a current state value, said selection being based on a flag bit value.

14. The method according to claim 1, wherein said averting comprises providing a next state value directly to a flip-flop input.

15. A system for maintaining state data in a finite state machine, said system comprising:
   an arrangement for binary-encoding states in the finite state machine; and
   an arrangement for averting invalid state transitions among the states via ascertaining prospective bit errors
      a set of N binary memory elements of the finite state machine for recording a binary-encoding of a current state of the finite state machine, wherein N>1, said finite state machine having a plurality of defined valid states, each defined valid state corresponding to a respective binary encoding of N bits, each bit corresponding to a respective binary memory element of the set of N binary memory elements, there being a respective set of defined valid state transitions corresponding to each defined valid state, wherein for at least one defined valid state, the respective set of defined valid state transitions does not include at least one transition to a defined valid state, wherein the binary encoded current state value recorded in said set of N binary memory elements is repeatedly updated by transitioning from a respective current state to a respective next state;
      an invalid state transition prevention circuit coupled to the inputs of said set of N binary memory elements for averting one or more respective invalid state transitions from each current state of a plurality of current states to a respective next state via ascertaining one or more respective prospective bit errors, each said invalid state transition being a state transition which is not a member of any of the sets of defined valid state transitions.

16. The system according to claim 15, wherein said invalid state transition prevention circuit receives a flag bit input corresponding to a prospective active state transition of a state, said invalid state transition prevention circuit preventing a change in state value recorded in said set of N binary memory elements in the absence of a corresponding value of said flag bit.

17. The system according to claim 16, wherein, for a state with an active flag bit value, said invalid state transition prevention circuit further acts to compare a binary encoding of a next state value with an encoded magnitude of a largest binary value among valid states.

18. The system according to claim 16, wherein said invalid state transition prevention circuit further comprises a two-stage MUX which gates prospective invalid state transitions.

19. The system according to claim 18, wherein, in a first stage, said MUX acts to select either of a next state or a reset state.

20. The system according to claim 19, wherein, in a second stage, said MUX acts to select an output of said first stage or returns to a current state value, based on a flag value.

21. The system according to claim 15, wherein said invalid state transition prevention circuit further comprises comparator logic which prevents an active state transition responsive to the binary encoding of the next state value being less than or equal to the encoded magnitude of a largest binary value among valid states.

22. The system according to claim 15, wherein said invalid state transition prevention circuit comprises a magnitude comparator.

* * * * *